US012777410B2

(12) United States Patent
Park et al.

(10) Patent No.: US 12,777,410 B2
(45) Date of Patent: Oct. 27, 2026

(54) METHOD AND APPARATUS FOR SUPPORTING MOBILITY FOR COLLECTION AND ANALYSIS OF NETWORK DATA IN WIRELESS COMMUNICATION NETWORK

(71) Applicant: Samsung Electronics Co., Ltd., Suwon-si (KR)

(72) Inventors: Jungshin Park, Suwon-si (KR); Yoonseon Han, Suwon-si (KR); Sangsoo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 519 days.

(21) Appl. No.: 17/926,866

(22) PCT Filed: May 21, 2021

(86) PCT No.: PCT/KR2021/006379
§ 371 (c)(1),
(2) Date: Nov. 21, 2022

(87) PCT Pub. No.: WO2021/235901
PCT Pub. Date: Nov. 25, 2021

(65) Prior Publication Data

US 2023/0209452 A1 Jun. 29, 2023

(30) Foreign Application Priority Data

May 21, 2020 (KR) ........................ 10-2020-0061090

(51) Int. Cl.
*H04W 48/18* (2009.01)
*H04W 8/02* (2009.01)
(Continued)

(52) U.S. Cl.
CPC ............. *H04W 48/18* (2013.01); *H04W 8/02* (2013.01); *H04W 24/02* (2013.01); *H04W 24/10* (2013.01); *H04W 36/0016* (2013.01)

(58) Field of Classification Search
None
See application file for complete search history.

(56) References Cited

U.S. PATENT DOCUMENTS

2019/0222489 A1 7/2019 Shan
2020/0252813 A1 8/2020 Li et al.
(Continued)

FOREIGN PATENT DOCUMENTS

CN 110677299 A 1/2020
CN 111095970 A 5/2020
(Continued)

OTHER PUBLICATIONS

Motorola Mobility, Lenovo; Key issue on efficient data collection by NWDAF, 3GPP TSG-SA WG2 Meeting #136, S2-1911574, Nov. 8, 2019, Reno, NV, USA.
(Continued)

*Primary Examiner* — Peter P Chau
(74) *Attorney, Agent, or Firm* — Jefferson IP Law, LLP

(57) ABSTRACT

Disclosed are a method and apparatus for supporting mobility for collection and analysis of network data in a wireless communication network. The method may comprise the steps of: identifying, by a first network function (NF) servicing a terminal, that the terminal moves from the first NF to a second NF; identifying that the first NF is subscribed to a network data collection and analytics function (NWDAF) so that the first NF uses analytics information related to the terminal; and transmitting, to the second NF, a message including information about subscriptions related to the NWDAF.

16 Claims, 7 Drawing Sheets

(51) Int. Cl.

| | |
|---|---|
| ***H04W 24/02*** | (2009.01) |
| ***H04W 24/10*** | (2009.01) |
| ***H04W 36/00*** | (2009.01) |

(56) References Cited

U.S. PATENT DOCUMENTS

| | | | | |
|---|---|---|---|---|
| 2022/0337486 | A1 | 10/2022 | Hong | |
| 2023/0037802 | A1 * | 2/2023 | Karampatsis | H04L 43/06 |

FOREIGN PATENT DOCUMENTS

| | | | |
|---|---|---|---|
| KR | 10-2021-0029624 | A | 3/2021 |
| WO | 2019/158777 | A1 | 8/2019 |

OTHER PUBLICATIONS

3GPP TR 23.740 V16.0.0, 3rd Generation Partnership Project; Technical Specification Group Services and System Aspects; Study on Enhancement of Network Slicing (Release 16), Dec. 19, 2018.

3GPP TS 23.288 V16.3.0, 3rd Generation Partnership Project; Technical Specification Group Services and System Aspects; Architecture enhancements for 5G System (5GS) to support network data analytics services (Release 16), May 20, 2020.

Motorola Mobility, Lenovo; Solution on efficient data collection by multiple NWDAF, 3GPP TSG-SA WG2 Meeting #136-ah, S2-2000773, Jan. 7, 2020, Incheon, Korea.

Samsung; NWDAF association information for AMF relocation, 3GPP TSG-SA WG2 Meeting #145E, S2-2104519, May 10, 2021, Elbonia.

Extended European Search Report dated Sep. 28, 2023, issued in European Patent Application No. 21807744.4-1216.

China Mobile et al., 'Clarification on UE mobility analytics exposed to AF', S2-2003323, 3GPP TSG-SA2 Meeting #138-E, Elbonia, Apr. 24, 2020.

Huawei et al., 'Mega CR on editorial corrections', S2-2002449, 3GPP TSG-WG SA2 Meeting #137E e-meeting, Elbonia, Feb. 29, 2020.

China Mobile et al., 'Add the definition for Maximum number of results parameter into clause 6.1.3', S2-2002456, 3GPP TSG-WG SA2 Meeting #137E e-meeting, Elbonia, Feb. 28, 2020.

Ericsson, Correct UE mobility and communication, C3-201217, 3GPP TSG-CT WG3 Meeting #108-e, E-Meeting, Feb. 15, 2020.

Chinese Office Action dated Jul. 16, 2025, issued in Chinese Patent Application No. 202180036603.5.

Chinese Notice of Allowance dated Mar. 12, 2026, issued in Chinese Patent Application No. 202180036603.5.

* cited by examiner

METHOD AND APPARATUS FOR SUPPORTING MOBILITY FOR COLLECTION AND ANALYSIS OF NETWORK DATA IN WIRELESS COMMUNICATION NETWORK

CROSS-REFERENCE TO RELATED APPLICATION(S)

This application is a U.S. National Stage application under 35 U.S.C. § 371 of an International application number PCT/KR2021/006379, filed on May 21, 2021, which is based on and claims priority of a Korean patent application number 10-2020-0061090, filed on May 21, 2020, in the Korean Intellectual Property Office, the disclosure of which is incorporated by reference herein in its entirety.

TECHNICAL FIELD

The disclosure relates to a method and apparatus for supporting mobility in collecting and analyzing network data to automate management of a wireless communication network.

BACKGROUND ART

To meet the demand for wireless data traffic having increased since deployment of 4G communication systems, efforts have been made to develop an improved 5G or pre-5G communication system. Therefore, the 5G or pre-5G communication system is also called a ‘Beyond 4G Network’ or a ‘Post LTE System’.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged.

As technology elements, such as “sensing technology”, “wired/wireless communication and network infrastructure”, “service interface technology”, and “Security technology” have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Along with the development of mobile communication systems as described above, various services may be provided, and as wireless communication networks become complex and diversified, there is a need for a technique of automating the management of a wireless communication network.

DETAILED DESCRIPTION OF THE INVENTION

Technical Problem

The disclosure defines a method and apparatus for providing a network data analytics and collection function to automate the management of a wireless communication network.

The disclosure defines a method and apparatus for supporting the mobility of a user equipment (UE) in a network entity that provides a network data analytics and collection function in a wireless communication network.

The disclosure defines a method and apparatus for controlling a signal flow between network function (NF) entities in a mobility management procedure for a UE.

The disclosure defines a method and apparatus for controlling a signal flow between NF entities in a source network management procedure that provides network data to support the mobility of a UE.

Technical Solution

According to an embodiment of the disclosure, a method of supporting mobility of a user equipment (UE) for a network data analytics function (NWDAF) in a wireless communication network may include identifying movement of the UE from a first network function (NF) servicing the UE to a second NF by the first NF, identifying that the first NF is subscribed to an NWDAF to consume analytics information related to the UE, and transmitting a message including information about subscriptions related to the NWDAF to the second NF.

According to an embodiment of the disclosure, a method of supporting mobility of a UE for an NWDAF in a wireless communication network may include receiving a message including information about subscriptions related to an NWDAF from a first NF servicing the UE by a second NF, wherein the message is transmitted from the first NF to the second NF in response to the first NF's identifying movement of the UE from the first NF to the second NF and the first NE's identifying that the first NF is subscribed to the NWDAF to consume analytics information related to the UE, and transmitting, to the NWDAF, a subscription request message for receiving the analytics information related to the UE based on the information about the subscriptions included in the message in response to the reception of the message by the second NF.

According to an embodiment of the disclosure, an apparatus of an NF entity supporting mobility of a UE for an NWDAF in a wireless communication network may include a transceiver and a processor operatively connected to the transceiver. The processor may be configured to identify movement of the UE from a first NF servicing the UE to a second NF by the first NF, identify that the first NF is subscribed to an NWDAF to consume analytics information related to the UE, and transmit a message including information about subscriptions related to the NWDAF to the second NF.

According to an embodiment of the disclosure, an apparatus of a new NF entity supporting mobility of a UE for an NWDAF in a wireless communication network may include a transceiver and a processor operatively connected to the transceiver. The processor may be configured to receive a message including information about subscriptions related to a NWDAF from an old NF servicing the UE, wherein the message is transmitted from the old NF to a new NF in response to the old NF's identifying movement of the UE from the old NF to the new NF and the old NF's identifying that the old NF is subscribed to the NWDAF to consume analytics information related to the UE, and transmit, to the NWDAF, a subscription request message for receiving the analytics information related to the UE in response to the reception of the message by the second NF.

MODE FOR CARRYING OUT THE INVENTION

Figure 1:
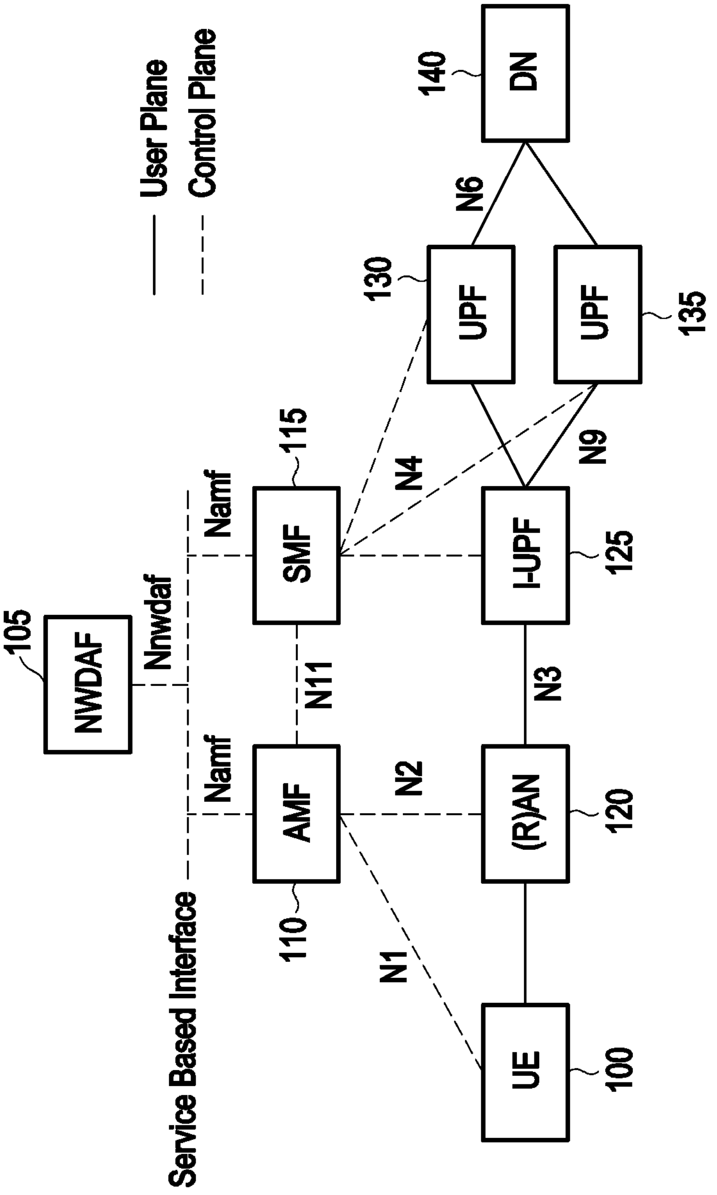
FIG. 1 is a diagram illustrating the configuration of a wireless communication network including a network data analytics function (NWDAF) according to an embodiment of the disclosure.

Embodiments of the disclosure will be described below with reference to the attached drawings.

A detailed description of a generally known function or structure of the disclosure will be avoided lest it should obscure the subject matter of the disclosure. Although the terms as described later are defined in consideration of functions in the disclosure, the terms may be changed according to the intention of a user or an operator, or customs. Therefore, the definitions should be made by the meanings of each term lying within.

For the same reason, some components may be exaggerated, omitted, or schematically illustrated in the attached drawings. Further, the drawn size of each component does not exactly reflect its real size. In each drawing, the same reference numerals are assigned to the same or corresponding components.

The advantages and features of the disclosure, and a method of achieving them will become apparent from reference to embodiments described below in detail in conjunction with the attached drawings. However, the disclosure may be implemented in various manners, not limited to the embodiments set forth herein. Rather, these embodiments are provided such that the disclosure is complete and thorough and its scope is fully conveyed to those skilled in the art, and the disclosure is only defined by the appended claims.

It will be understood that each block of flowchart illustrations and combinations of the flowchart illustrations can be implemented by computer program instructions. These computer program instructions may be loaded on a processor of a general purpose computer, special purpose computer, or other programmable data processing equipment, such that the instructions, which are executed via the processor of the computer or other programmable data processing equipment, create means for implementing the functions specified in the flowchart block(s). These computer program instructions may also be stored in a computer-usable or computer-readable memory that can direct the computer or other programmable data processing equipment to function in a particular manner, such that the instructions stored in the computer-usable or computer-readable memory produce an article of manufacture including instruction means which implement the function specified in the flowchart block(s). The computer program instructions may also be loaded onto the computer or other programmable data processing equipment to cause a series of operations to be performed on the computer or other programmable data processing equipment to produce a computer implemented process such that the instructions which are executed on the computer or other programmable equipment provide operations for implementing the functions specified in the flowchart block(s).

Furthermore, the respective blocks may illustrate parts of modules, segments, or codes including one or more executable instructions for performing specific logic function(s). Moreover, it should be noted that the functions of the blocks may be performed in a different order in alternative implementations. For example, two successive blocks may be performed substantially at the same time, or may be performed in reverse order according to their functions.

The term 'unit' as used herein means, but is not limited to, a software or hardware component such as a field programmable gate array (FPGA) or application specific integrated circuit (ASIC), which performs certain tasks. A 'unit' may advantageously be configured to reside on an addressable storage medium and configured to be executed on one or more processors. Thus, a 'unit' may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided in the components and 'units' may be combined into fewer components and 'units' or further separated into additional components and 'units'. In addition, the components and 'units' may be implemented such that they are executed on one or more central processing units (CPUs) in a device or a secure multimedia card. Further, a 'unit' may include one or more processors and/or devices in an embodiment.

For convenience of description, some terms and names defined in the 3rd generation partnership project long term evolution (3GPP LTE)-based communication standards (e.g., 5G, NR, LTE, or a similar system standard). However, the disclosure is not limited by the terms and names, and is equally applicable to systems conforming to other standards.

Terms identifying access nodes, terms signifying network entities, terms signifying messages, terms signifying interfaces between network entities, and terms signifying various types of identification information as used in the following description are given for convenience of description. Accordingly, the disclosure is not limited to the terms described below, and the terms may be replaced by other equivalent terms in technical meanings.

While embodiments of the disclosure are described mainly in the context of a radio access network new RAN (NR) in the 5G mobile communication standard specified by a mobile communication standard standardization organization, the 3GPP, and a packet core (5G system, 5G core network, or next generation (NG) core)) as a core network, the subject matter of the disclosure is applicable to other communication systems having a similar technical background with slight modifications without departing from the scope of the disclosure, as judged by those skilled in the art.

In the 5G system, a network data collection and analysis function (NWDAF), which is a network function (NF) providing a function of analyzing and providing data collected from a 5G network, may be defined to support network automation. The NWDAF may collect/store/analyze information from the 5G network and provide the result to at least one NF, and the analytics result may be used independently in each NF.

The 5G mobile communication system supports NFs to use the result of network-related data (hereinafter, referred to as network data) collection and analytics through the NWDAF. This is done to provide network data collection and analytics required for each NF to effectively provide a function provided by the NF in a centralized manner. The NWDAF may perform network data collection and analytics using a network slice as a basic unit. However, the scope of the disclosure is not limited to the unit of a network slice, and the NWDAF may additionally analyze various pieces of information (e.g., service quality) obtained from a user equipment (UE), a PDU session, an NF state, and/or an external service server.

An analytics result from the NWDAF may be delivered to each NF that has requested the analytics result and used to optimize network management functions such as quality of service (QoS) guarantee/improvement, traffic control, mobility management, and load balancing.

A unit node performing each function provided by the 5G network system may be defined as an NF (or referred to as an NF entity or an NF node). The NF may include at least one of, for example, an access and mobility management function (AMF) that manages access of a UE to an access network (AN) and mobility of the UE, a session management function (SMF) that performs session-related management, a user plane function (UPF) that manages a user data plane, or a network slice selection function (NSSF) that selects an available network slice instance for the UE.

FIG. 1 is a diagram illustrating the configuration of a wireless communication network including an NWDAF according to an embodiment of the disclosure.

Referring to FIG. 1, an NWDAF 105 may collect network data in various manners from at least one source NF, for example, NFs in a 5G core network such as an AMF 110, an SMF 115, or UPFs 125, 130 and 135, an application function (AF) for efficient service provision, a network exposure function (NEF), or an operation, administration, and maintenance (OAM). The AMF 110 may be connected to a UE 100 and a radio access network (RAN) 120, and the UPFs 125, 130 and 135 may connect user traffic of the UE 100 to at least one data network (DN) 140 through the RAN 120.

Further, the NWDAF 105 may provide analytics of network data collected from a network or the outside to at least one consumer NF. The NWDAF 105 may collect and analyze the load level of a network slice instance and provide it to an NSSF, so that a specific UE is selected to use it. A service-based interface defined in the 5G network may be used to request analytics information or transmit the analytics information including an analytics result between the NFs 110 and 115 and the NWDAF 105, and for example, a hypertext transfer protocol (HTTP) and/or JavaScript object notation (JSON) document may be used for the delivery.

In an example, data collected by the NWDAF 105 may include at least one of an application identifier (ID), IP filter information, or a media/application bandwidth from a point coordination function (PCF), a UE ID or location information from an AMF, a destination data network name (DDN), a UE IP, a QoS flow bit rate, a QoS flow ID (QFI), a QoS flow error rate, or a QoS flow delay from an SMF, or a traffic usage report from a UPF.

The NWDAF may additionally collect at least one of, for example, an NF resource status, an NF throughput, or service level agreement (SLA) information from an OAM, which is an entity that may affect a connection between a UE and a service server, a UE status, UE application information, or a UE usage pattern from a UE, or a service application ID, a service experience, or a traffic pattern from an AF, in addition the NFs of the core network, and use the additionally collected information for analytics.

The following Table 1 to Table 3 illustrate examples of network data collected by the NWDAF. A period and a time point for network data collection of the NWDAF from an entity may be different for each entity. Besides, the correlation of collected data may be identified by a correlation ID for correlating data of each collection target and a timestamp for recording a collection time.

TABLE 1

| Information | Source | Description |
|---|---|---|
| Application | AF | To identify the service and support analytics per |

TABLE 1-continued

| Information | Source | Description |
|---|---|---|
| ID | | type of service (the desired level of service) |
| IP filter information | AF | Identify a service flow of the UE for the application |
| Locations of Application | AF/ NEF | Locations of application represented by a list of DNAI(s). The NEF may map the AF-Service-Identifier information to a list of DNAI(s) when the DNAI(s) being used by the application are statically defined. |
| Service Experience | AF | Refers to the QoE per service flow as established in the SLA and during on boarding. It can be either e.g. MOS or video MOS as specified in ITU-T P.1203.3 or a customized MOS |
| Timestamp | AF | A time stamp associated to the Service Experience provided by the AF, mandatory if the Service Experience is provided by the ASP. |

TABLE 2

| Information | Source | Description |
|---|---|---|
| Timestamp | 5GC NF | A time stamp associated with the collected information. |
| Location | AMF | The UE location information. |
| SUPI(s) | AMF | If UE IDs are not provided as target of analytics reporting for slice service experience, AMF returns the UE IDs matching the AMF event filters. |
| DNN | SMF | DNN for the PDU Session which contains the QoS flow |
| S-NSSAI | SMF | S-NSSAI for the PDU Session which contains the QoS flow |
| Application ID | SMF | Used by NWDAF to identify the application service provider and application for the QoS flow |
| IP filter information | SMF | Provided by the SMF, which is used by NWDAF to identify the service data flow for policy control and/or differentiated charging for the QoS flow |
| QFI | SMF | QoS Flow Identifier |
| QoS flow Bit Rate | UPF | The observed bit rate for UL direction; and The observed bit rate for DL direction |
| QoS flow Packet Delay | UPF | The observed Packet delay for UL direction; and The observed Packet delay for the DL direction |
| Packet transmission | UPF | The observed number of packet transmission |
| Packet retransmission | UPF | The observed number of packet retransmission |

TABLE 3

| Information | Source | Description |
|---|---|---|
| Timestamp | OAM | A time stamp associated with the collected information. |
| Reference Signal Received Power | OAM | The per UE measurement of the received power level in a network cell, including SS-RSRP, CSI-RSRP as specified in clause 5.5 of TS 38.331 and E-UTRA RSRP as specified in clause 5.5.5 of TS 36.331 |
| Reference Signal Received Quality | OAM | The per UE measurement of the received quality in a network cell, including SS-RSRQ, CSI-RSRQ as specified in clause 5.5 of TS 38.331 and E-UTRA RSRQ as specified in clause 5.5.5 of TS 36.331 |
| Signal-to-noise and interference ratio | OAM | The per UE measurement of the received signal to noise and interference ratio in a network cell, including SS-SINR, CSI-SINR, E-UTRA RS-SINR, as specified in clause 5.1 of TS 38.215 |

Figure 2:
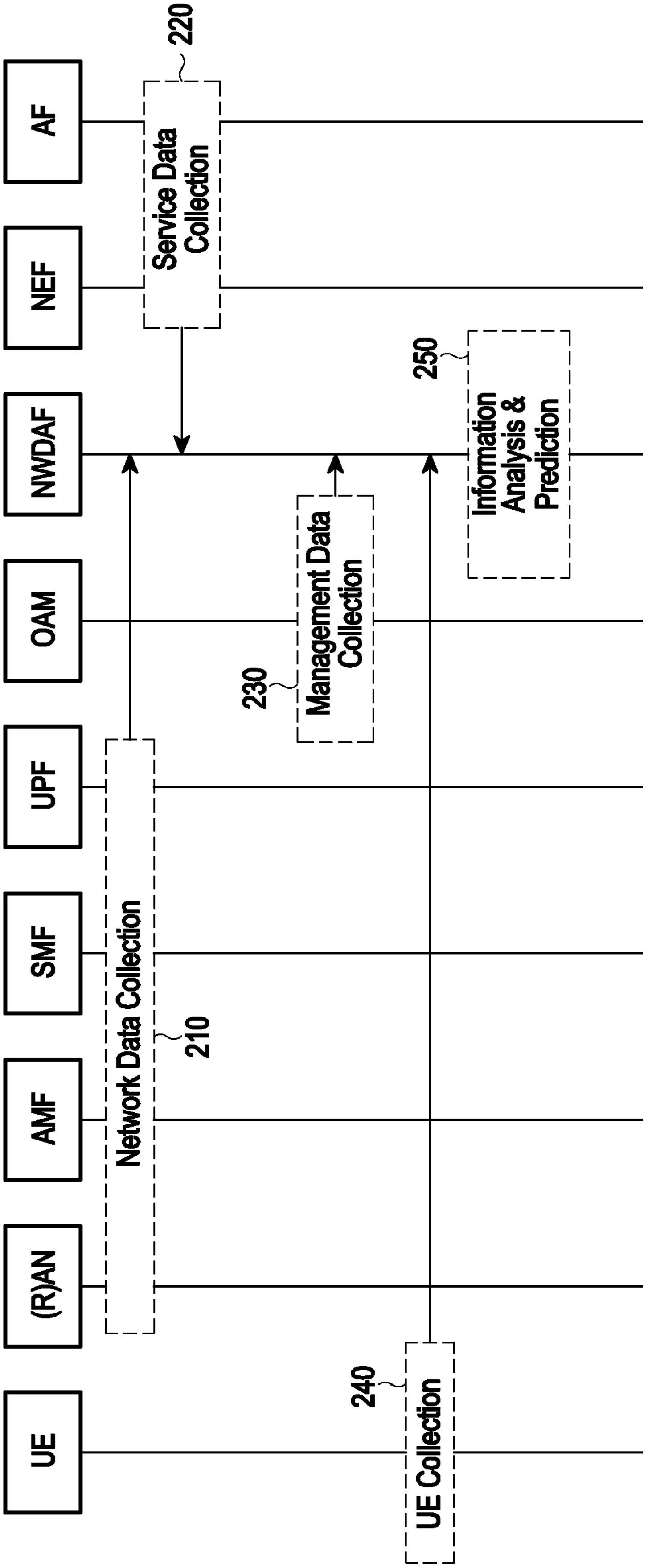
FIG. 2 is a diagram illustrating a signal flow for a network data collection and analytics operation according to an embodiment of the disclosure.

FIG. 2 is a diagram illustrating an overall structure for collecting and analyzing network data according to an embodiment of the disclosure.

Referring to FIG. 2, an NWDAF may collect network data from NFs such as a RAN, an AMF, an SMF, and a UPF in operation 210, collect service data from an NEF or an AF in operation 220, collect management data from an OAM in operation 230, and collect UE data from a UE in operation 240. Examples of the collected data are shown in Table 1 to Table 3. In operation 250, the NWDAF may analyze the collected data and provide an analytics result to a corresponding NF, upon request.

Figure 3:
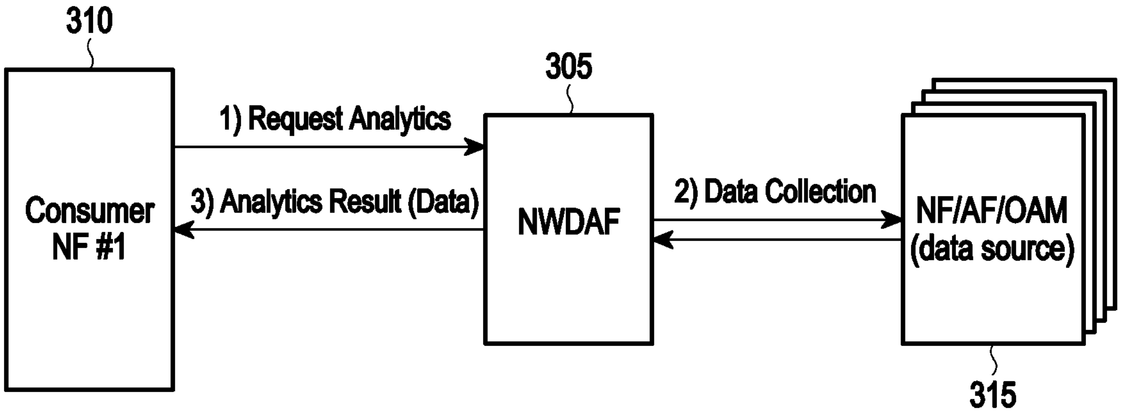
FIG. 3 is a diagram illustrating the overall structure of a network data collection and analytics system according to an embodiment of the disclosure.

FIG. 3 is a diagram illustrating the overall structure of a network data collection and analytics system according to an embodiment of the disclosure.

Referring to FIG. 3, each network entity which may be an AMF, an SMF, an OAM, or a RAN included in a core network may operate as a consumer NF 310 requesting analytics information generated as a result of analytics in an NWDAF 305 as in operation 1. The NWDAF 305 may collect data from a source NF 315 such as an NF, an AF, or an OAM and analyze the collected data to generate the analytics information requested by the consumer NF 310 as in operation 2. As in operation 3, the NWDAF 305 may transmit the analytics information to the consumer NF 310 that has transmitted the request. The consumer NF 310 may use the analytics information received from the NWDAF 305 in the process of determining control parameters and operations for its own function.

The NWDAF 305 may collect required data from the NFs 315 in the network to provide the analytics information requested by the consumer NF 310. The data collection of the NWDAF 305 is performed based on subscriptions of the corresponding NFs. The source NF 315 may receive a subscription request from the NWDAF 305 and provide requested network data.

Figure 4:
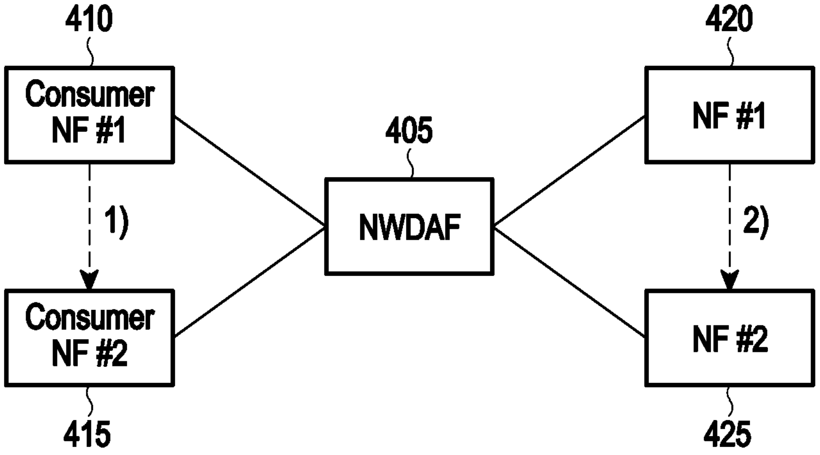
FIG. 4 is a diagram illustrating a problem that may be caused by mobility in a wireless communication network including an NWDAF.

FIG. 4 is a diagram illustrating a problem caused by mobility in a wireless communication network including an NWDAF.

Referring to FIG. 4, an NWDAF 405 may collect data from source NF1 420 and transmit analytics information to consumer NF1 410.

In a wireless communication network, an NF that processes a signaling message of a UE according to a predetermined criterion (e.g., movement of the UE and/or a network load change) may be changed according to its location or time. In this process, a UE-related network entity may be changed from consumer NF1 410 to consumer NF2 415 or from source NF1 420 to source NF2 425. Then, subscription information between the NWDAF 405 and consumer NF1 410 is no longer valid, and for network automation, new consumer NF2 415 may have to perform a subscription procedure for the NWDAF 405 again from the beginning. In addition, since subscription information between the NWDAF 405 and source NF1 420 is also invalid, the NWDAF 405 should cancel the subscription information and perform a subscription procedure with source NF2 425 again. This additional procedure may increase a signaling message load in the network.

To solve this problem, the disclosure proposes embodiments of data collection and analytics result delivery supporting NF mobility.

Figure 5:
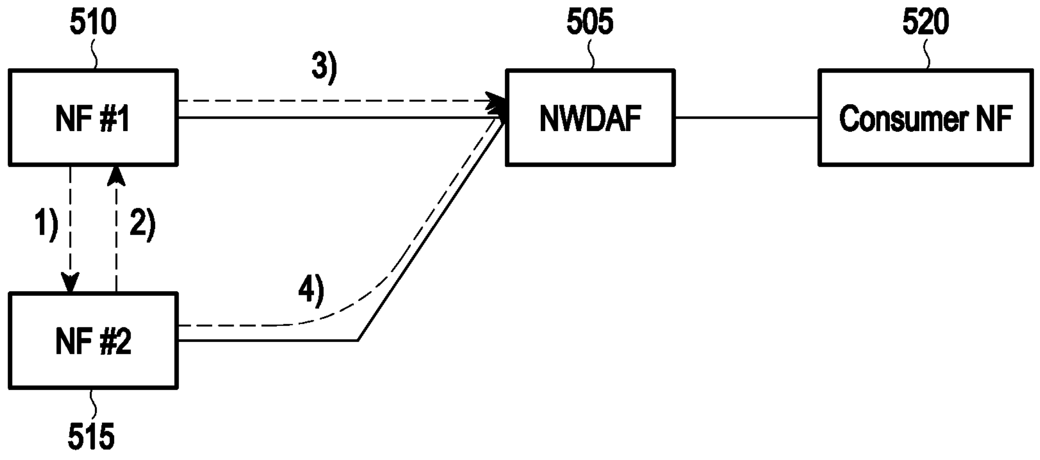
FIG. 5 is a diagram illustrating a source NF changing procedure according to an embodiment of the disclosure.

FIG. 5 is a diagram illustrating a procedure of changing a source NF according to an embodiment of the disclosure. Various embodiments of the disclosure may include at least one of the following operations.

Referring to FIG. 5, new source NF NF2 515 may receive, from old source NF NF1 510, subscription information about network data that old source NF NF1 510 has provided to an NWDAF 505 for a UE, as in operation 1). In an embodiment, the subscription information may be transmitted in at least one signal message used in a mobility management procedure (e.g., a registration procedure and/or a handover procedure) for reflecting movement of a UE. In an embodiment, the subscription information may include at least one of an NWDAF ID of the NWDAF 505, a list of analytics IDs that identify the types of analytics information that the NWDAF 505 may generate, a list of data that NF1 510 is providing to the NWDAF 505, subscription parameters, a subscription correlation ID, or a notification ID.

NF2 515 may select at least one piece of subscription information that needs to be updated from the received subscription information, and transmit information indicating the selected subscription information, for example, a list of subscription correlation IDs or notification IDs corresponding to the subscription correlation IDs to NF1 510, as in operation 2). NF1 510 may receive the list of the subscription correlation IDs or the notification IDs corresponding to the subscription correlation IDs from NF2 515, and report mobility from NF1 510 to NF2 515 to the NWDAF 505, while transmitting the received list of the subscription correlation IDs or the notification IDs corresponding to the subscription correlation IDs to the NWDAF 505 in operation 3). NF2 515 may perform a subscription information update procedure for the selected subscription information, together with the NWDAF 505 as in operation 4). The NWDAF 505 may maintain the received list of the subscription correlation IDs until before the subscription information update procedure of NF2 515 is performed. When the subscription information update procedure of NF2 515 is completed, the selected subscription information in the NWDAF 505 may be updated to be related to NF2 515.

In an embodiment, NF1 510 may receive a list of unselected subscription information from NF2 515, and unsubscribe subscriptions of the unselected subscription information for the NWDAF 505. In an embodiment, NF1 510 may identify the unselected subscription information by receiving a list of the selected subscription information from NF2 515, and unsubscribe the subscriptions of the unselected subscription information for the NWDAF 505.

Based on the updated subscription information, the NWDAF 505 may collect network data from a new source NF, NF2 515, and provide an analytics result of the collected data to a consumer NF 520.

Update of subscription information for network automation is enabled in the process of changing a source NF through the procedure of FIG. 5, which may prevent a network automation function from being stopped due to mobility, and restrict generation of an unnecessary signal message caused by invalidation of subscription information in the NWDAF 505.

Figure 6:
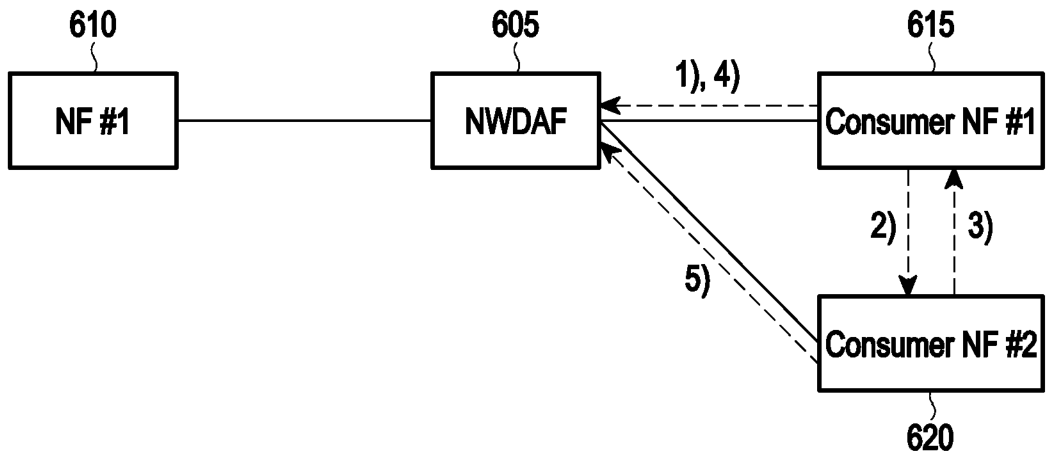
FIG. 6 is a diagram illustrating a consumer NF changing procedure according to an embodiment of the disclosure.

FIG. 6 is a diagram illustrating an operation procedure when a consumer NF is changed according to an embodiment of the disclosure. Various embodiments of the disclosure may include at least one of the following operations.

Referring to FIG. 6, an old consumer NF, consumer NF1 615 may detect that a UE has moved to a new consumer NF, consumer NF2 620. In an embodiment, consumer NF1 615 may determine mobility of the UE by processing (transmitting or receiving) at least one signal message in a mobility management procedure (e.g., a registration procedure and/or a handover procedure) based on the mobility of the UE. In operation 1), consumer NF1 615 may transmit a signal message indicating that a mobility event related to a consumer NF change for the UE to an NWDAF 605. In operation 2), consumer NF1 615 may transmit subscription information about analytics information related to the UE, which has been requested from the NWDAF 605, to consumer NF2 620 by signal messages transmitted in the mobility management procedure for the UE. In an embodiment, the subscription information may include at least one of an NWDAF ID of the NWDAF 505, a list of analytics IDs that identify the types of analytics information that the NWDAF 505 may generate, a list of data that NF1 510 is providing to the NWDAF 505, subscription parameters, a subscription correlation ID, or a notification ID.

Consumer NF2 620 may select subscription information that needs to be updated from the received subscription information, and perform a subscription information update procedure for the selected subscription information with the NWDAF 605 in operation 5). Consumer NF2 620 may transmit, to consumer NF1 615, a subscription information list indicating the remaining subscription information, that is, unselected subscription information except for the selected subscription information in operation 3), and consumer NF 615 may unsubscribe subscriptions of the unselected subscription information for the NWDAF 605 in operation 4).

In an embodiment, consumer NF2 620 may select desired subscription information to be maintained even after handover caused by the mobility of the UE in operation 3). In this case, a list of the selected subscription information may be transmitted to consumer NF1 615. Then, in operation 4), consumer NF1 615 may perform a procedure of unsubscribing the subscriptions of the remaining subscription information, that is, the unselected subscription information except for the selected subscription information of the received list in subscription information about analytics information related to the UE, with the NWDAF 605.

Based on the updated subscription information, the NWDAF 605 may provide an analytics result of data collected from the source NF 610 to new consumer NF2 620.

Update of subscription information for network automation is enabled in the process of changing a consumer NF through the procedure of FIG. 6, which may prevent a network automation function from being stopped due to mobility, and restrict generation of an unnecessary signal message caused by invalidation of subscription information in the NWDAF 605.

Figure 7:
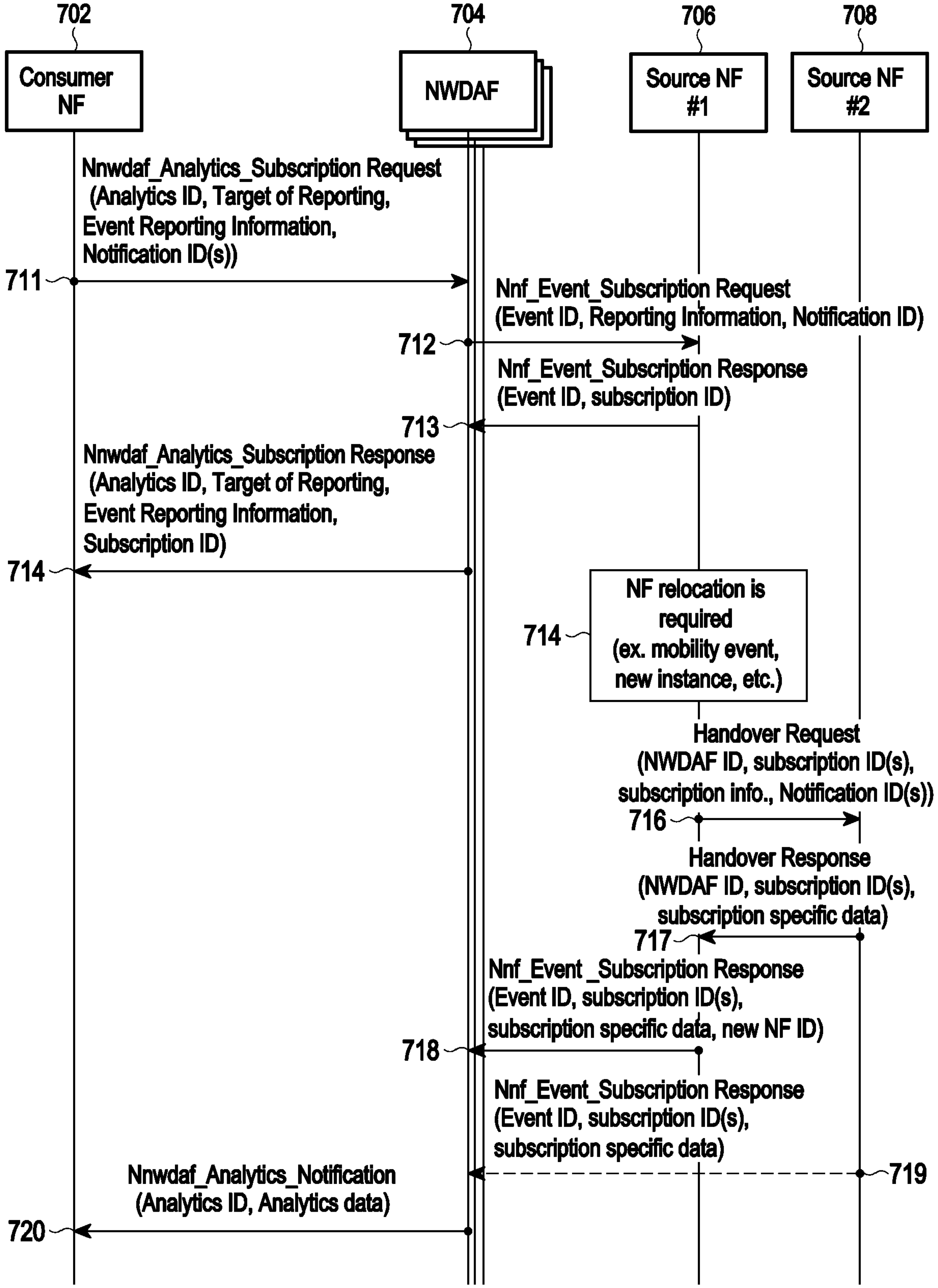
FIG. 7 is a diagram illustrating a procedure of updating subscriptions of an NWDAF, when a source NF is changed according to an embodiment of the disclosure.

FIG. 7 illustrates a procedure of updating subscriptions of an NWDAF, when a source NF is changed according to an embodiment of the disclosure. Various embodiments of the disclosure may include at least one of the following operations.

Referring to FIG. 7, a consumer NF 702 may transmit a subscription request message Nnwdaf_Analytics_Subscription Request requesting provision of analytics information to an NWDAF 704 in operation 711. The subscription request message may include at least one of an analytics ID indicating the type of analytics information that the consumer NF 702 wants to receive, a target of reporting specifying a target for which analytics information is requested (e.g., a UE, a UE group, or all UEs), or event reporting information specifying a reporting period and/or a reporting method of the analytics information. In an embodiment, the subscription request message may include a notification ID to be used in reporting the analytics information for the subscription request based on the subscription request message. The NWDAF 704 may select at least one source NF, that is, source NF #1 706 capable of providing data that needs to be collected for calculation of the analytics information by examining the subscription request of the consumer NF 702, and transmit an event subscription request message Nnf_Event_Subscription Request requesting data provision to selected source NF #1 706 in operation 712. The event subscription request message may include a notification ID to be used in a report message in which source NF #1 706 transmits data to the NWDAF 704, together with an event ID and reporting information.

In operation 713, source NF #1 706 may examine the subscription request according to the event subscription request message of the NWDAF 704, and transmit an approval result in an event subscription response message Nnf_Event_Subscription Response to the NWDAF 704. In an embodiment, the event subscription response message may include a subscription ID (or a subscription correlation ID) identifying the subscription request, together with the event ID.

In operation 714, the NWDAF 704 transmits a subscription response message Nnwdaf_Analytics_Subscription Response including an acceptance of the subscription request of operation 711 to the consumer NF 702. The subscription response message may include the subscription ID (or subscription correlation ID) identifying the subscription request.

In operation 715, source NF #1 706 may determine that an NF change or NF relocation is required based on a predetermined criterion, for example, movement of the UE and/or network load balancing.

In operation 716, source NF #1 706 may transmit, to a new source NF, source NF #2 708, an NWDAF ID of the NWDAF 704 related to network automation, to which source NF #1 706 has subscribed, and information about subscriptions related to the NWDAF 704 in a signal message (e.g., a handover request message requesting handover of the UE) related to mobility management, which is transmitted to source NF #2 708 for the UE. For example, the information about the subscriptions may include at least one of a subscription ID, subscription-specific data, and a notification ID used for data reporting, for each subscription. In an embodiment, the subscription-specific data may include information required to report network data to the NWDAF 704, such as an event ID designated for the corresponding subscription or reporting information.

In operation 717, source NF #2 708 may transmit a handover response message for the handover request message to source NF #1 706. The handover response message may include an NWDAF ID and information about selected subscriptions that source NF #2 708 wants to use after the handover, for example, subscription ID(s) and/or a list of subscription-specific data for each selected subscription. In an embodiment, the subscription-specific data in the information about the selected subscriptions may include at least some subscription-specific data with modified parameter values among the subscription-specific data received from source NF #1 706. In an embodiment, the subscription-specific data may be related to at least some subscription-specific data selected or modified as needed by source NF #2 708 among the subscription-specific data received from source NF #1 706, or to at least some parameters.

In operation 718, source NF #1 706 may transmit, to the NWDAF 704, a message Nnf_Event_Subscription Response including an event ID for the selected subscriptions received from source NF #2 708, subscription ID(s) of the selected subscriptions, subscription-specific data updated by source NF #2 708, and the ID of a new source (i.e., source NF #2 708) (new NE ID=NF #2), The NWDAF 704 may store the received information about the selected subscriptions and delete unselected subscriptions (and information about the corresponding subscriptions). In an embodiment, source NF #1 706 or source NF #2 708 may perform a separate unsubscription procedure for unsubscribing the unselected subscriptions for the NWDAF 704, rather than the NWDAF 704 automatically unsubscribes the unselected subscriptions.

In an embodiment, operation 719 may be selectively performed. In operation 719, source NF #2 708 may select subscriptions to be maintained from the information about the existing subscriptions received from source NF #1 706, and perform a subscription update procedure for the selected subscriptions with the NWDAF 704. In an embodiment, when operation 719 is performed, operation 718 may be omitted.

In operation 720, the NWDAF 704 may collect data from the new source NF, NF #2 708 based on the subscriptions updated through the above operations, and transmit analytics information generated based on the collected data to the consumer NF 702.

Figure 8:
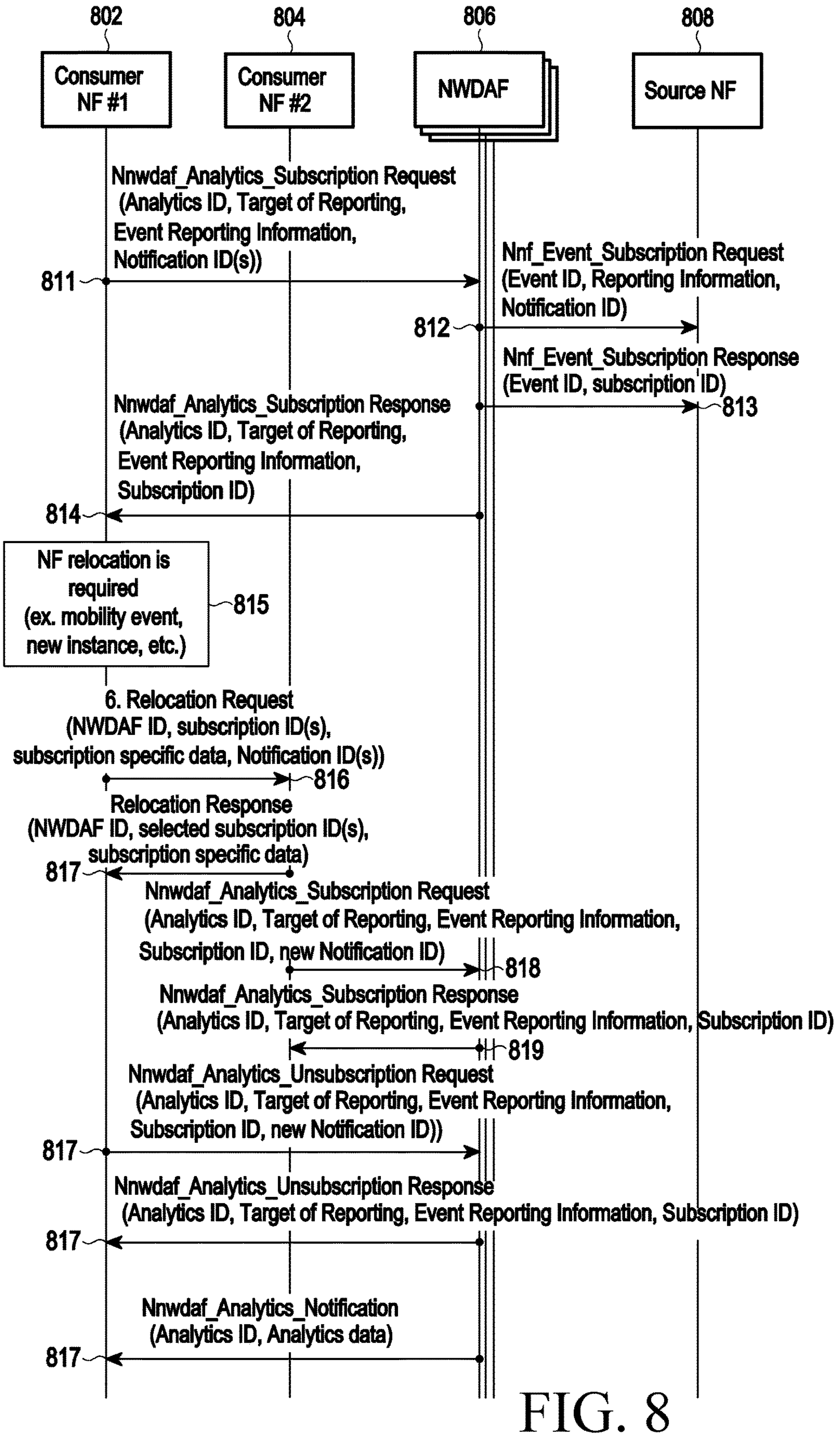
FIG. 8 is a diagram illustrating a procedure of updating subscriptions of an NWDAF, when a consumer NF is changed according to an embodiment of the disclosure.

FIG. 8 illustrates a procedure of updating subscriptions of an NWDAF, when a consumer NF is changed according to an embodiment of the disclosure. Various embodiments of the disclosure may include at least one of the following operations.

Referring to FIG. 8, a consumer NF, consumer NF #1 802 may transmit a subscription request message Nnwdaf_Analytics_Subscription Request requesting provision of analytics information to an NWDAF 806 in operation 811. The subscription request message may include at least one of an analytics ID indicating the type of analytics information that consumer NF #1 802 wants to receive, a target of reporting specifying a target for which analytics information is requested (e.g., a UE, a UE group, or all UEs), or event reporting information specifying a reporting period and/or a reporting method of the analytics information. In an embodiment, the subscription request message may include a notification ID to be used in reporting the analytics information for the subscription request based on the subscription request message.

The NWDAF 806 may select at least one source NF 808 capable of providing data that needs to be collected for calculation of the analytics information by examining the subscription request of consumer NF #1 802, and transmit an event subscription request message Nnf_Event_Subscription Request requesting data provision to the selected source NF 808 in operation 812. In an embodiment, the event subscription request message may include a notification ID to be used in a report message in which the source NF 808 transmits data to the NWDAF 806, together with an event ID and reporting information.

In operation 813, the source NF 808 may examine the subscription request according to the event subscription request message of the NWDAF 806, and transmit an approval result in an event subscription response message Nnf_Event_Subscription Response to the NWDAF 806. In an embodiment, the event subscription response message may include a subscription ID (or a subscription correlation ID) identifying the subscription request, together with the event ID.

In operation 814, the NWDAF 806 may transmit a subscription response message Nnwdaf_Analytics_Subscription Response including an acceptance of the subscription request of operation 811 to consumer NF #1 802. The subscription response message may include the subscription ID (or subscription correlation ID) identifying the subscription request.

In operation 815, consumer NF #1 802 may determine that an NF change or NF relocation is required based on a predetermined criterion, for example, movement of a UE and/or network load balancing.

In operation 816, consumer NF #1 802 may transmit, to consumer NF #2 804, an NWDAF ID of the NWDAF 806 related to network automation, to which consumer NF #1 802 has subscribed, and information about subscriptions related to analytics information that is being received from the NWDAF 806 in a signal message (e.g., a relocation request message requesting a function change for the UE) related to mobility management of the UE, which is transmitted to a new consumer NF, consumer NF #2 804 for the UE. For example, the information about the subscriptions may include at least one of a subscription ID, subscription-specific data, and a notification ID used for data reporting, for each subscription. In an embodiment, the subscription-specific data may include information required to specify the requested analytics information to the NWDAF 806, such as an analytics ID that the NWDAF 806 accepts for the corresponding subscription, a target of reporting, or event reporting information.

In operation 817, consumer NF #2 804 may transmit a relocation response message for the relocation request message to consumer NF #1 802. The relocation response message may include an NWDAF ID and information about selected subscriptions that consumer NF #2 804 wants to use after the relocation, for example, subscription ID(s) and a list of subscription-specific data which needs to be modified, for each selected subscription. In an embodiment, the subscription-specific data in the information about the selected subscriptions may include at least some of the subscription-specific data received from consumer NF #1 802 or at least some subscription-specific data with modified parameter values among the received subscription-specific data. In an embodiment, the subscription-specific data may be related to at least some subscription-specific data selected or modified as needed by source NF #2 708 among the subscription-specific data received from source NF #1 706, or to at least some parameters.

In operation 818, consumer NF #2 804 may transmit, to the NWDAF 806, a subscription request message including updated subscription-specific data (e.g., including at least one of an analytics ID, a target of reporting, or event reporting information) and a new notification ID allocated to the corresponding subscription by consumer NF #2, for information about the selected subscriptions identified by subscription IDs. The NWDAF 806 may detect a stored subscription identified by each subscription ID in response to the reception of the subscription request message in operation 818, and update the detected subscription with the updated subscription-specific data included in the subscription request message. In an embodiment, the NWDAF 806 may delete pre-stored subscriptions (and information about the pre-stored subscriptions) which are not included in the subscription request message of operation 818.

In operation 819, the NWDAF 806 may transmit, to consumer NF #2 804, a subscription response message indicating that the subscription(s) identified by the subscription ID(s) of the subscription request message have been successfully updated.

In an embodiment, operations 820 and 821 may be selectively performed. In operations 820 and 821, consumer NF #1 802 may transmit an unsubscription request message requesting a deletion procedure to be performed for subscriptions unselected by consumer NF #2 804, based on the subscriptions selected by consumer NF #2 804 in operation 818, and receive an unsubscription response message from the NWDAF 806 in response to the transmitted message. In an embodiment, the NWDAF 806 may delete the unselected subscriptions, upon request of consumer NF 31 802, not automatically.

In operation 821, the NWDAF 806 may transmit analytics information requested by the new consumer NF, consumer NF #2 804, based on the subscriptions updated through the above operations to consumer NF #2 804, using a new notification ID designated by consumer NF #2 804 in operation 818.

Figure 9:
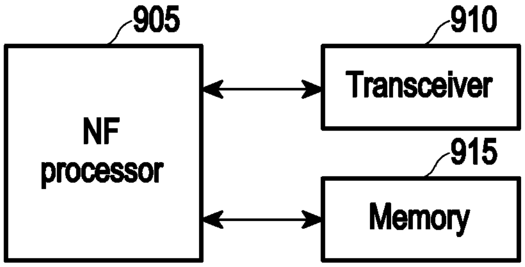
FIG. 9 is a diagram illustrating the configuration of an NF entity according to an embodiment of the disclosure.

FIG. 9 illustrates the configuration of an NF entity according to an embodiment of the disclosure. The illustrated configuration may be applied to a consumer NF or a source NF according to at least one of the embodiments of the disclosure.

Referring to FIG. 9, the NF entity may include a transceiver 910, memory 915, and a processor 905. The transceiver 910, the memory 915, and the processor 905 of the NF entity may operate according to the above-described NF operations. The configuration of the NF entity is not limited to the illustrated example, and for example, the NF entity may include more or fewer components. The transceiver 910, the memory 915, and the processor 905 may be implemented as at least one chip. In an embodiment, the NF entity may include at least one of a RAN or an entity included in a core network, for example, an AMF, an SMF, or a UPF.

The transceiver 910 is configured to transmit and receive signal messages, collected data, and analytics data to and from a UE, another NF, or an NWDAF. The memory 915 is configured to store programs and data required for the operations of the NF entity. Further, the memory 915 is configured to store control information or data included in a signal obtained by the NF entity. The memory 915 may be configured as a storage medium or a combination of storage media such as ROM, RAM, hard disk, CD-ROM, and DVD. Further, the memory 915 may include a plurality of memories.

The processor 905 according to an embodiment of the disclosure may control a series of processes so that the NF entity may operate according to at least one of the above-described embodiments. According to some embodiments, the NF entity may subscribe to an NWDAF to transmit a request for available analytics information and receive a response including the available analytics information from the NWDAF. According to some embodiments, the NF entity may exchange signal messages for supporting mobility and subscription information with another NF entity and the NWDAF entity. The processor 905 may perform only some operations of the above-described embodiments. The processor 905 may control all processes so that the NF entity operates according to all or some of the above-described embodiments, not limited to some operations.

Figure 10:
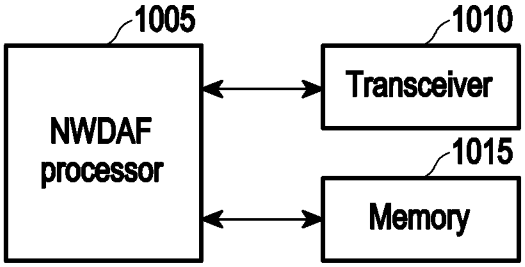
FIG. 10 is a diagram illustrating the configuration of an NWDAF entity according to an embodiment of the disclosure.

FIG. 10 illustrates the configuration of an NWDAF entity according to an embodiment of the disclosure.

Referring to FIG. 10, the NWDAF entity may include a transceiver 1010, memory 1015, and a processor 1005. The transceiver 1010, the memory 1015, and the processor 1005 of the NWDAF entity may operate according to the above-described NWDAF operations. The configuration of the NWDAF entity is not limited to the illustrated example, and for example, the NWDAF entity may include more or fewer components. The transceiver 1010, the memory 1015, and the processor 1005 may be implemented as at least one chip. In an embodiment, the NWDAF entity may include at least one of a RAN or an entity included in a core network, for example, an AMF, an SMF, or a UPF.

The transceiver 1010 is configured to transmit and receive signal messages, collected data, and analytics information to and from NFs. The memory 1015 is configured to store programs and data required for the operations of the NWDAF entity. Further, the memory 1015 is configured to store control information or data included in a signal obtained by the NWDAF entity. The memory 1015 may be configured as a storage medium or a combination of storage media such as ROM, RAM, hard disk, CD-ROM, and DVD. Further, the memory 1015 may include a plurality of memories.

The processor 1005 according to an embodiment of the disclosure may control a series of processes so that the NWDAF F entity may operate according to at least one of the above-described embodiments. According to some embodiments, the NWDAF entity may receive a subscription request for data analytics from a consumer NF, and transmit a response including available analytics information to the subscribed consumer NF. According to some embodiments, the NWDAF entity may transmit a subscription request to a source NF and receive collected data from the source NF. According to some embodiments, the NWDAF may exchange signal messages for supporting mobility and subscription information with at least one NF entity. The processor 1005 may perform only some operations of the above-described embodiments. The processor 1005 may control all processes so that the NWDAF entity operates according to all or some of the above-described embodiments, not limited to some operations.

According to various embodiments, a method of supporting mobility of a UE for an NWDAF in a wireless communication network may include identifying movement of the UE from a first NF servicing the UE to a second NF by the first NF, identifying that the first NF is subscribed to an NWDAF to consume analytics information related to the UE, and transmitting a message including information about subscriptions related to the NWDAF to the second NF.

In an embodiment, the information about the subscriptions may include an NWDAF ID identifying the NWDAF and subscription-specific data.

In an embodiment, the subscription-specific data may include at least one of at least one analytics ID indicating a type of analytics information generated by the NWDAF, a target of reporting indicating a target for which the analytics information is requested, or reporting information indicating a reporting period and/or a reporting method of the analytics information.

In an embodiment, the information about the subscriptions may further include at least one of a subscription correlation ID related to the subscriptions provided to the first NF by the NWDAF in a subscription process performed for the first NF to receive analytics information from the NWDAF, or a notification ID identifying a notification related to the subscriptions, provided to the NWDAF by the first NF in the subscription process performed for the first NF to receive analytics information from the NWDAF.

In an embodiment, the method may further include, after transmitting the message, transmitting an unsubscription message related to the subscriptions to the NWDAF.

In an embodiment, at least one of the first NF or the second NF may include an AMF or an SMF.

In an embodiment, identifying the movement of the UE may include identifying handover of the UE or an NF change for network load balancing.

According to various embodiments, a method of supporting mobility of a UE for an NWDAF in a wireless communication network may include receiving a message including information about subscriptions related to an NWDAF from a first NF servicing the UE by a second NF, wherein the message is transmitted from the first NF to the second NF in response to the first NF's identifying movement of the UE from the first NF to the second NF and the first NE's identifying that the first NF is subscribed to the NWDAF to consume analytics information related to the UE, and transmitting, to the NWDAF, a subscription request message for receiving the analytics information related to the UE based on the information about the subscriptions included in the message in response to the reception of the message by the second NF.

In an embodiment, the information about the subscriptions may include an NWDAF ID identifying the NWDAF and subscription-specific data.

In an embodiment, the subscription-specific data may include at least one of at least one analytics ID indicating a type of analytics information generated by the NWDAF, a target of reporting indicating a target for which the analytics information is requested, or reporting information indicating a reporting period and/or a reporting method of the analytics information.

In an embodiment, the information about the subscriptions may further include at least one of a subscription correlation ID related to the subscriptions provided to the first NF by the NWDAF in a subscription process performed for the first NF to receive analytics information from the NWDAF, or a notification ID identifying a notification related to the subscriptions, provided to the NWDAF by the first NF in the subscription process performed for the first NF to receive analytics information from the NWDAF.

In an embodiment, at least one of the first NF or the second NF may include an AMF or an SMF.

In an embodiment, the movement of the UE may include handover of the UE or an NF change for network load balancing.

According to various embodiments, an apparatus of an NF entity supporting mobility of a UE for an NWDAF in a wireless communication network may include a transceiver and a processor operatively connected to the transceiver. The processor may be configured to identify movement of the UE from a first NF servicing the UE to a second NF by the first NF, identify that the first NF is subscribed to an NWDAF to consume analytics information related to the UE, and transmit a message including information about subscriptions related to the NWDAF to the second NF.

According to various embodiments, an apparatus of a new NF entity supporting mobility of a UE for an NWDAF in a wireless communication network may include a transceiver and a processor operatively connected to the transceiver. The processor may be configured to receive a message including information about subscriptions related to a NWDAF from an old NF servicing the UE, wherein the message is transmitted from the old NF to a new NF in response to the old NF's identifying movement of the UE from the old NF to the new NF and the old NF's identifying that the old NF is subscribed to the NWDAF to consume analytics information related to the UE, and transmit, to the NWDAF, a subscription request message for receiving the analytics information related to the UE in response to the reception of the message by the second NF.

The embodiments of the disclosure disclosed in the specification and the drawings provide merely specific examples to easily describe the technical content of the disclosure and help the understanding of the disclosure, not intended to limit the scope of the disclosure. That is, it is apparent to those skilled in the art that other medication examples can be implemented based on the technical spirit of the disclosure. Further, the embodiments may be operated in combination, when needed. For example, at least part of each of the embodiments of the disclosure may be operated in combination by a base station (BS) or a UE.

In the specific embodiments of the disclosure described above, components included in the disclosure are represented as singular or plural according to the provided specific embodiments. However, a singular or plural expression is selected suitably for a presented situation, for convenience of description, and the disclosure is not limited by a single component or plural components. Even plural components may be configured as a single component or even a single component may be configured as plural components.

The embodiments of the disclosure disclosed in the specification and the drawings provide merely specific examples to easily describe the technical content of the disclosure and help the understanding of the disclosure, not intended to limit the scope of the disclosure. In addition, the foregoing embodiments of the disclosure are merely exemplary, and those skilled in the art will understand that various modifications and embodiments of an equivalent range are possible from them. Accordingly, the true technical protection scope of the disclosure should be defined by the appended claims.

The invention claimed is:

1. A method by a first access and mobility management function (AMF), the method comprising:

identifying an AMF change from the first AMF to a second AMF;

identifying that the first AMF is a consumer of a network data analytics function (NWDAF) related to a user equipment (UE); and transmitting, to the second AMF for the AMF change, a message including information about analytics subscriptions related to the NWDAF, wherein the information about the analytics subscriptions comprises at least one subscription correlation ID, an NWDAF ID identifying the NWDAF, and at least one analytics ID.

2. The method of claim 1, wherein the information about the analytics subscriptions further comprises at least one of:

at least one notification ID;

a target of reporting indicating a target for which analytics information is requested; or reporting information indicating a reporting period and/or a reporting method of the analytics information.

3. The method of claim 2, wherein the at least one subscription correlation ID is related to the analytics subscriptions and is provided to the first AMF by the NWDAF during a subscription process performed for the first AMF to receive the analytics information from the NWDAF.

4. The method of claim 1, further comprising, transmitting an unsubscription message related to the analytics subscriptions to the NWDAF.

5. The method of claim 1, wherein the AMF change is identified during one of a registration procedure or a handover procedure.

6. A method by a second access and mobility management function (AMF), the method comprising:

receiving, from a first AMF, a message including information about analytics subscriptions related to a network data analytics function (NWDAF) related to a user equipment (UE), wherein the message is transmitted from the first AMF to the second AMF in response to the first AMF identifying a AMF change from the first AMF to the second AMF and the first AMF is a consumer of the NWDAF; and transmitting, to the NWDAF, a subscription request message to request analytics information related to the UE based on the information about the analytics subscriptions, wherein the information about the analytics subscriptions comprises at least one subscription correlation ID, an NWDAF ID identifying the NWDAF, and at least one analytics ID.

7. The method of claim 6, wherein the information about the analytics subscriptions further comprises at least one of:

at least one notification ID;

a target of reporting indicating a target for which the analytics information is requested; or reporting information indicating a reporting period and/or a reporting method of the analytics information.

8. The method of claim 7, wherein the at least one subscription correlation ID is related to the analytics subscriptions and is provided to the first AMF by the NWDAF during a subscription process performed for the first AMF to receive the analytics information from the NWDAF.

9. The method of claim 6, wherein the AMF change is identified during one of a registration procedure or a handover procedure.

10. An apparatus of a first access and mobility management function (AMF), the apparatus comprising:

a transceiver and a processor operatively connected to the transceiver, wherein the processor is configured to:

identify a AMF change from the first AMF to a second AMF, identify that the first AMF is a consumer of a network data analytics function (NWDAF) related to a user equipment (UE), and transmit, to the second AMF for the AMF change, a message including information about analytics subscriptions related to the NWDAF, wherein the information about the analytics subscriptions comprises at least one subscription correlation ID, an NWDAF ID identifying the NWDAF, and at least one analytics ID.

11. An apparatus of a second access and mobility management function (AMF), the apparatus comprising:

a transceiver and a processor operatively connected to the transceiver, wherein the processor is configured to:

receive, from a first AMF, a message including information about analytics subscriptions related to a network data analytics function (NWDAF) related to a user equipment (UE), wherein the message is transmitted from the first AMF to the second AMF in response to the first AMF identifying that a AMF change from the first AMF to the second AMF and the first AMF is a consumer of the NWDAF, and transmit, to the NWDAF, a subscription request message to request analytics information related to the UE based on the information about the analytics subscriptions, wherein the information about the analytics subscriptions comprises at least one subscription correlation ID, an NWDAF ID identifying the NWDAF, and at least one analytics ID.

12. The apparatus of claim 10, wherein the information about the analytics subscriptions further comprises at least one notification ID, a target of reporting indicating a target for which analytics information is requested, or reporting information indicating a reporting period and/or a reporting method of the analytics information.

13. The apparatus of claim 12, wherein the at least one subscription correlation ID is related to the analytics subscriptions and is provided to the first AMF by the NWDAF during a subscription process performed for the first AMF to receive the analytics information from the NWDAF.

14. The apparatus of claim 10, wherein the processor is further configured to:

transmit an unsubscription message related to the analytics subscriptions to the NWDAF.

15. The apparatus of claim 11, wherein the information about the analytics subscriptions further comprises at least one notification ID, a target of reporting indicating a target for which the analytics information is requested, or reporting information indicating a reporting period and/or a reporting method of the analytics information.

16. The apparatus of claim 15, wherein the at least one subscription correlation ID is related to the analytics subscriptions and is provided to the first AMF by the NWDAF during a subscription process performed for the first AMF to receive the analytics information from the NWDAF.

* * * * *